United States Patent [19]
Ono et al.

[11] Patent Number: 5,088,777
[45] Date of Patent: Feb. 18, 1992

US005088777A

[54] LOCK DEVICE FOR DETACHABLE ROOF

[75] Inventors: Tomio Ono; Ryo Tsuruo; Hiromi Koyama, all of Kanagawa; Ryoji Fujihara, Tokyo, all of Japan

[73] Assignees: Nissan Motor Co., Ltd.; Ohi Seisakusho Co., Ltd., both of Japan

[21] Appl. No.: 638,579

[22] Filed: Jan. 8, 1991

[30] Foreign Application Priority Data

Jan. 9, 1990 [JP] Japan .................... 2-1021

[51] Int. Cl.$^5$ ............................................. E05C 13/00
[52] U.S. Cl. ......................... 292/40; 292/DIG. 5; 292/150; 292/346
[58] Field of Search ............... 296/120; 292/DIG. 5, 292/7, 346, 150; 70/416, 418

[56] References Cited

U.S. PATENT DOCUMENTS

| 4,113,294 | 9/1978 | Bierman | 292/346 |
| 4,540,215 | 9/1985 | Swearingen | 296/218 |
| 4,628,300 | 12/1986 | Amato | 292/346 X |
| 4,786,091 | 11/1988 | Shiraishi et al. | 292/36 |
| 4,902,058 | 2/1990 | Ohhashi et al. | 292/346 X |

FOREIGN PATENT DOCUMENTS

| 0297615 | 1/1928 | United Kingdom . |
| 0561259 | 3/1943 | United Kingdom . |
| 2092218 | 8/1982 | United Kingdom . |
| 2119014 | 11/1983 | United Kingdom . |
| 2176528 | 12/1986 | United Kingdom . |
| 2230049 | 10/1990 | United Kingdom . |
| 2236140 | 3/1991 | United Kingdom . |

Primary Examiner—Richard E. Moore
Attorney, Agent, or Firm—Leydig, Voit & Mayer

[57] ABSTRACT

A lock device for locking a detachable roof to a car body, which a housing mounted to the detachable roof, the housing defining a certain clearance through which the interior of the housing is exposed to the outside of the housing; a handle lever including a base portion pivotally arranged in the housing and a grip portion projected into the outside of the housing, the base portion being formed with a curved guide slot which has at least a locking part; a lock member linked to the handle lever in such a manner that, when the handle lever is pivoted to a lock position, the lock member becomes operative and, when the handle lever is pivoted to an unlock position, the lock member becomes inoperative; a guide pin movably received in the housing and slidably engaged with the curved guide slot of the handle lever, the guide pin suppressing the handle lever from pivoting from the lock position toward the unlock position when received in the locking part of the guide slot; a slide member incorporated with the guide pin, the slide member being movable in a given direction to disengage the guide pin from the locking part; a lockable stopper which can assume a locking position to suppress the movement of the slide member in the given direction; and a wall member raised from the slide member in a manner to conceal the guide pin from the certain clearance.

14 Claims, 9 Drawing Sheets

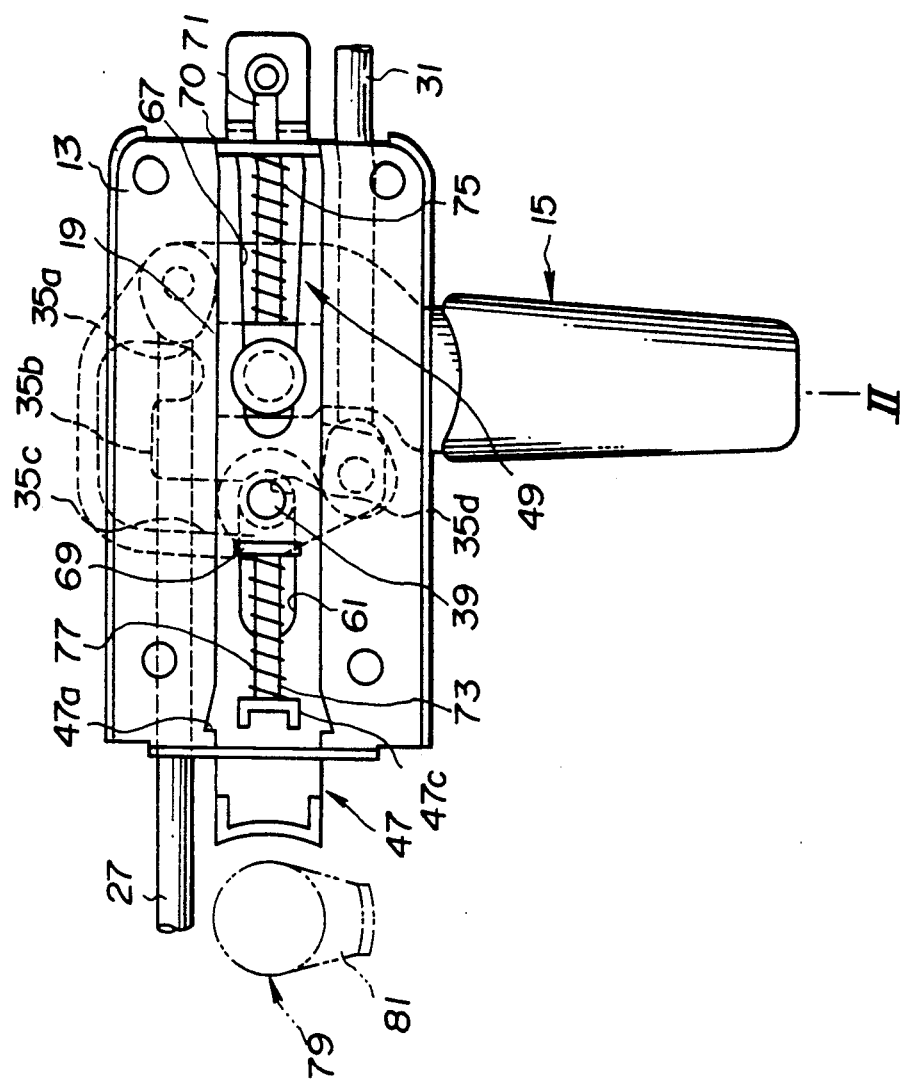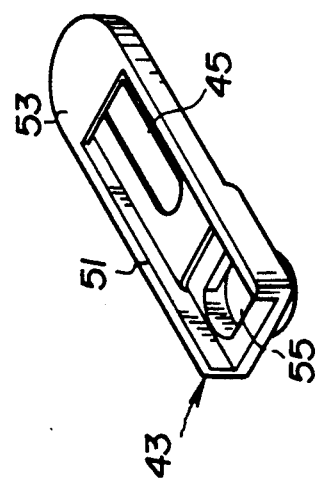

LOCK DEVICE FOR DETACHABLE ROOF

BACKGROUND OF THE INVENTION

1. Field of the Invention

The present invention relates in general to lock devices, and more particularly to lock devices of a type which locks a detachable hard roof to an open-type sport car or the like.

2. Description of the Prior Art

In open-type sport cars, detachable hard roofs are widely used for converting the cars to roofed sport cars. In this case, lock devices are used for achieving a locked engagement of the roof with the car body.

In order to clarify the task of the present invention, one conventional lock device of the above-mentioned type will be described with reference to FIGS. 9 to 11 of the accompanying drawings, which is disclosed in Japanese Utility Model First Provisional Publication No. 63-287627.

As is understood from the drawings, the conventional lock device comprises a base member 105 secured to a detachable roof (not shown). A handle lever 101 is pivotally connected through a pivot shaft 103 to the base member 105, so that the handle lever 101 is pivotal between a lock position as illustrated by a solid line and an unlock position as illustrated by a phantom line. The handle lever 101 has at its base portion 107 a generally C-shaped guide slot 109. One angled end portion of the slot 109 is designated by numeral 111.

Two rods 201 and 203 are pivotally connected to the base portion 107 of the handle lever 101. Each rod 201 or 203 extends to a lock pin (not shown) which is axially movably mounted on an edge of the detachable roof. Thus, in response to the pivotal movement of the handle lever 101, the lock pins are projected and withdrawn selectively. In fact, when, with the detachable roof properly put on the car body, the handle lever 101 is pivoted to the lock position, the lock pins are projected into lock holes of the car body thereby to achieve a locked engagement between the roof and the car body. While, when the handle lever is pivoted to the unlock position, the lock pins are withdrawn from the lock holes thereby to cancel the locked engagement between them.

When, as is seen from FIG. 9, the handle lever 101 assumes the lock position, a guide pin 113 carried on a slide member 117 is received in the angled end portion 111 of the guide slot 109. The guide pin 113 is biased rightward in FIG. 9 by a spring 114 relative to the slide member 117, that is, in the direction to hold the guide pin 113 in the angled end portion 111. For smoothing the movement of the guide pin 113 relative to the slide member 117, the slide member 117 is formed with a guide slot 119.

Accordingly, when the handle lever 101 assumes the lock position, the same is prevented from pivoting toward the unlock position due to obstruction of the guide pin 113 which abuts against one side edge of the angled end portion 111. However, as is seen from FIG. 11, when, by manipulating a knob 115 secured to the slide member 117, the slide member 117 is shifted leftward, that is, in the direction of the arrow as illustrated, the guide pin 113 is disengaged from the angled end portion 111. Under this condition, the pivoting of the handle lever 101 toward the unlock position is permitted.

As is understood from FIG. 9, the leftward shifting of the slide member 117 is blocked by a lockable stopper 121 when the stopper 121 assumes its lock position as illustrated by a solid line. Thus, when the lockable stopper 121 assumes the lock position, the knob 115 is inoperative and thus the lock position of the handle lever 101 is assuredly held.

However, due to its inherent construction, the above-mentioned conventional lock device has the following drawbacks.

That is, even under the lock condition of the handle lever 101, the guide pin 113 is permitted to move relative to the slide member 117 along the guide slot 119 due to the nature of the arrangement of the guide pin 113. Thus, as is understood from FIG. 11, if a pick or the like is inserted through a clearance 125 (designated by numeral 123 is a trim cover) for unjustly manipulating the guide pin 113, the pin 113 is easily disengaged from the angled end portion 111 of the guide slot 109. Under this condition, the handle lever 101 is permitted to pivot from the lock position to the unlock position allowing removal of the roof from the car body. This is quite undesirable particularly in the theft protection.

Furthermore, if, as is seen from FIG. 11, a considerable downward force "F" is applied to the handle lever 101 during the pivoting of the same, the pivoting movement of the handle lever 101 is not smoothly carried out because the guide pin 113 and the pivot shaft 103 must bear a great stress.

SUMMARY OF THE INVENTION

It is therefore an object of the present invention to provide a lock device for a detachable automotive roof, which is free of the above-mentioned drawbacks.

According to the present invention, there is provided a lock device for locking a detachable roof to a car body. The lock device comprises a housing mounted to the detachable roof, the housing defining a certain clearance through which the interior of the housing is exposed to the outside of the housing; a handle lever including a base portion pivotally arranged in the housing and a grip portion projected into the outside of the housing, the base portion being formed with a curved guide slot which has at least a locking part; a lock member linked to the handle lever in such a manner that, when the handle lever is pivoted to a lock position, the lock member becomes operative and, when the handle lever is pivoted to an unlock position, the lock member becomes inoperative; a guide pin movably received in the housing and slidably engaged with the curved guide slot of the handle lever, the guide pin suppressing the handle lever from pivoting from the lock position toward the unlock position when received in the locking part of the guide slot; a slide member incorporated with the guide pin, the slide member being movable in a given direction to disengage the guide pin from the locking part; a lockable stopper which can assume a locking position to suppress the movement of the slide member in the given direction; and a wall member raised from the slide member in a manner to conceal the guide pin from the certain clearance.

BRIEF DESCRIPTION OF THE DRAWINGS

Other objects and advantages of the present invention will become apparent from the following description when taken in conjunction with the accompanying drawings, in which:

FIGS. 5, 6 and 7 are bottom views of the lock device of the invention, showing various conditions of the same;

FIG. 8 is a perspective view of a modified protection wall member usable in the invention;

DETAILED DESCRIPTION OF THE INVENTION

Referring to FIGS. 1 to 7, there is shown a lock device 3 according to the present invention.

Figure 3:
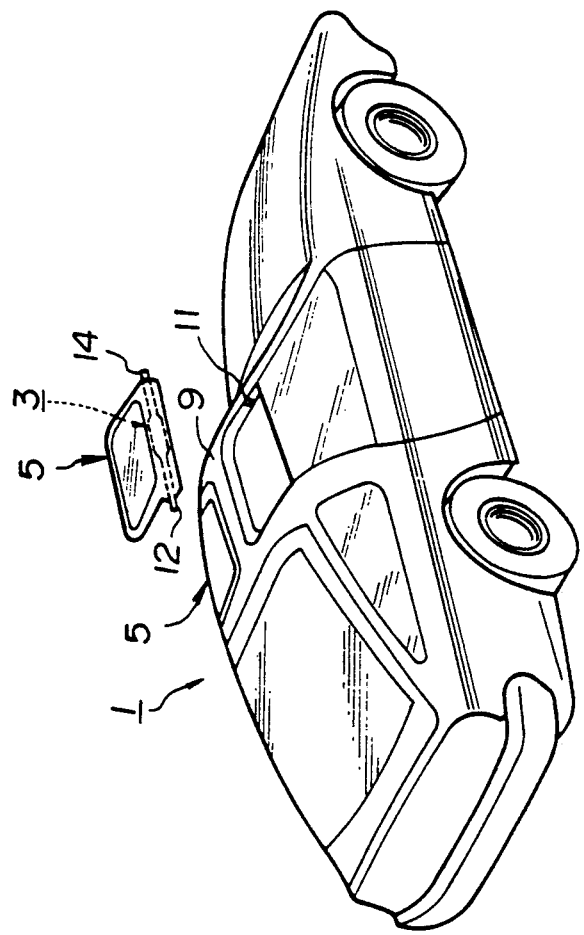
FIG. 3 is a perspective view of an open-type sport car to which the detachable roof of FIG. 2 is applied.

FIG. 3 shows an open-type sport car 1 to which a detachable roof 5 equipped with the lock device 3 of the invention is applied.

As is understood from FIG. 3, the detachable roof 5 is equipped at one side with a housing 7 in which the lock device 3 is installed. Two lock pins 12 and 14 are axially movably connected to opposed end walls 7b and 7a of the housing 7. As will become apparent as the description proceeds, the lock pins 12 and 14 are linked to the lock device 3, and the lock pins 12 and 14 are lockingly engaged with lock holes 11 and 11 of the car body 1 when the roof 5 is properly mounted on the car body 1.

Figure 1:
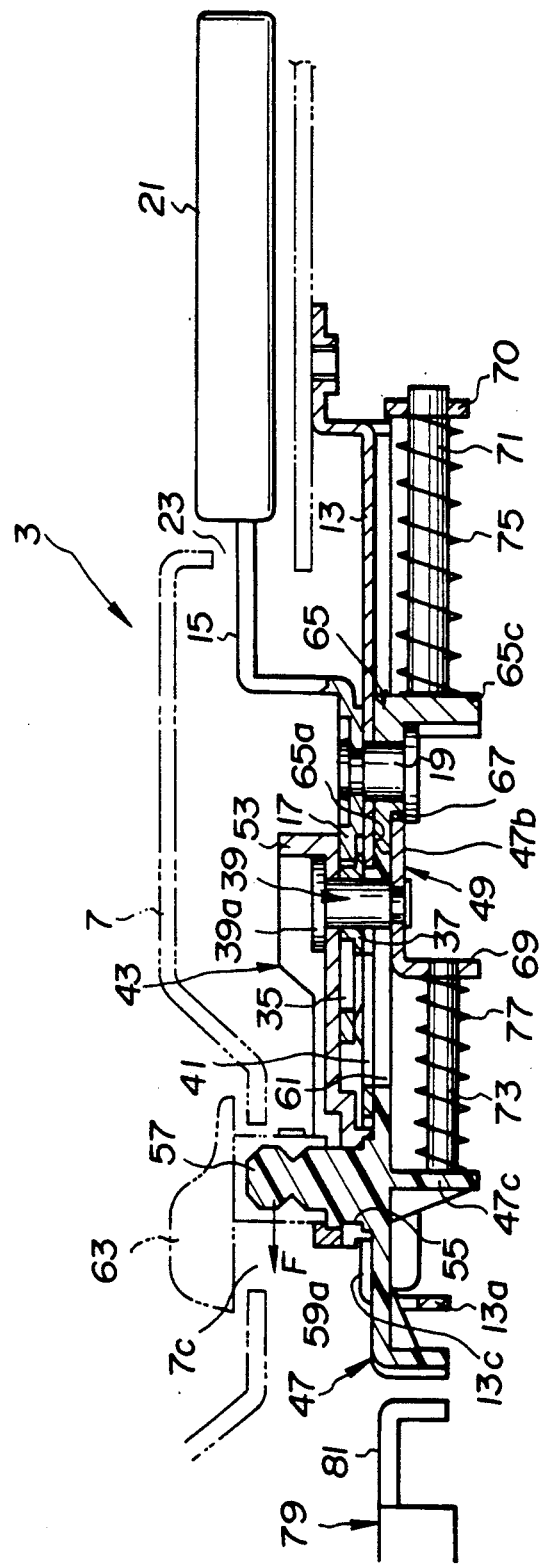
FIG. 1 is a sectional view of a lock device according to the present invention.
Figure 4:
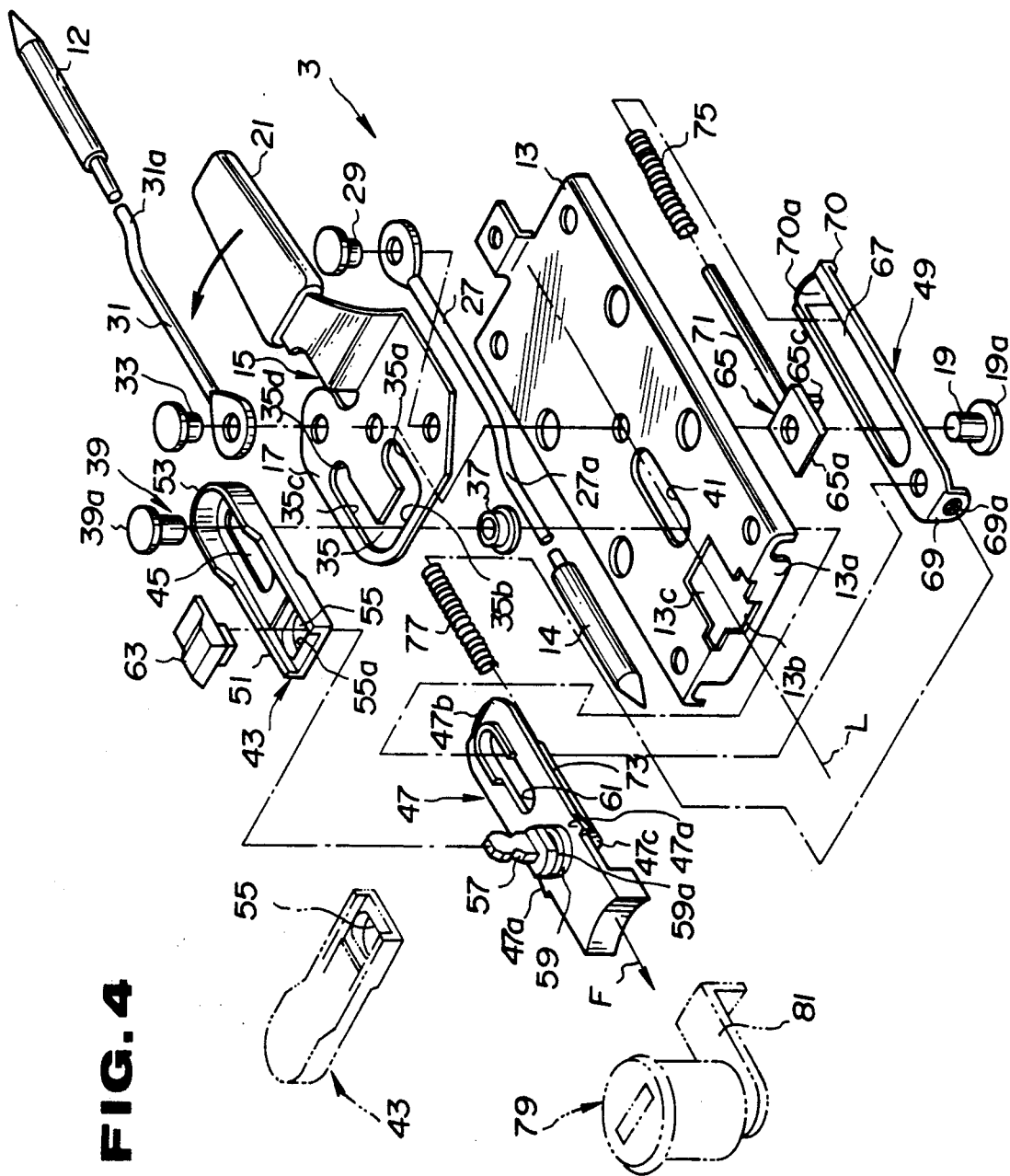
FIG. 4 is an exploded view of the lock device of the present invention.
Figure 5:
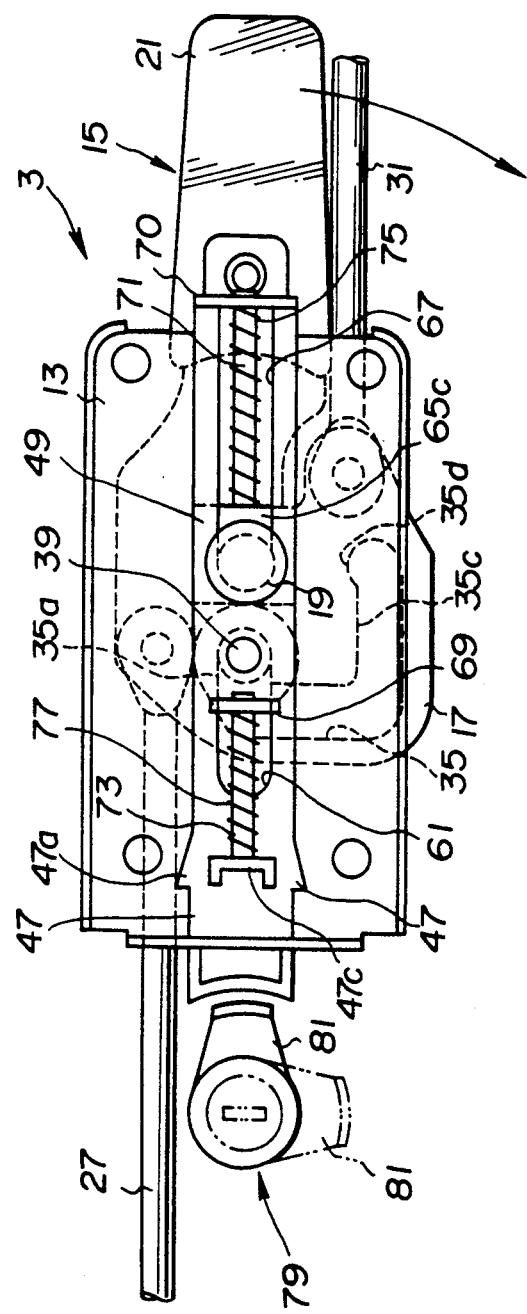

As is seen from FIGS. 1 and 4, installed within the housing 7 is a base plate 13 which is secured to the roof 5. A handle lever 15 is pivotally connected at its base portion 17 to a middle portion of the base plate 13 through a pivot pin 19. Thus, the handle lever 15 is pivotal about the pivot pin 19 between a lock position "I" as shown in FIG. 5 and an unlock position "II" as shown in FIG. 7.

As is understood from FIG. 4, the pivot pin 19 is positioned on a straight line "L" which includes the axes of the lock pins 12 and 14.

As is seen from FIG. 3, the handle lever 15 of the lock device 3 projects outwardly through a slit 23 into a recess 25 formed on the housing 7. A grip member 21 is secured to the projected end portion of the handle lever 15.

As is seen from FIG. 4, the base portion 17 of the handle lever 15 is formed, at opposed portions thereof with respect to the pivot pin 19, with openings (no numerals) to which respective rods 27 and 31 extending from the lock pins 14 and 12 are pivotally connected through respective pivot pins 29 and 33. Each rod 27 or 33 has a cranked part 27a or 31a.

Figure 2:
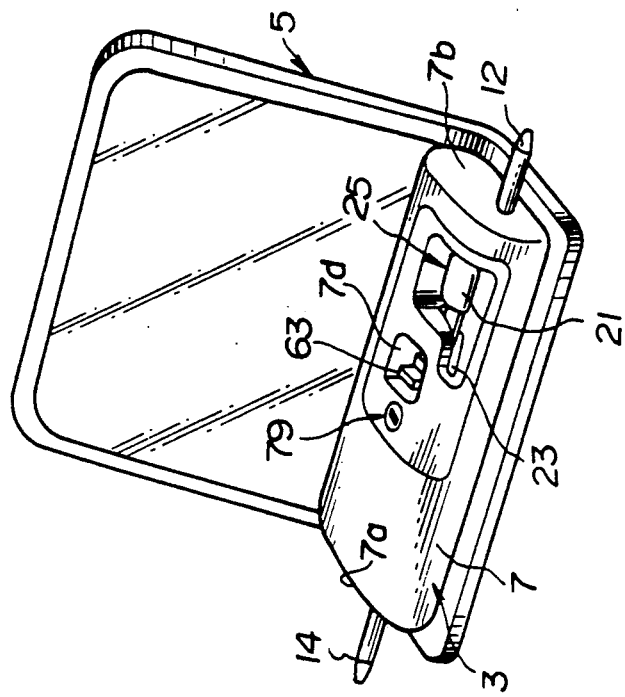
FIG. 2 is a perspective view of a detachable automotive roof to which the lock device of the invention is applied.

Accordingly, when the handle lever 15 is pivoted to the lock position "I" as shown in FIG. 5, the lock pins 12 and 14 are projected from the opposed end walls 7b and 7a of the housing 7 (see FIG. 2). When the handle lever 15 is pivoted to the unlock position "II" as shown in FIG. 7, the lock pins 12 and 14 are retracted into the housing 7.

The base portion 17 of the handle lever 15 is formed with a generally C-shaped guide slot 35. The slot 35 comprises a shorter engaging part 35a which is positioned near the pivot pin 19 and extends along the straight line "L", a first guide part 35b which extends perpendicularly from the shorter engaging part 35a, a second guide part 35c which extends perpendicularly from the first guide part 35b and a terminal engaging part 35d which is positioned at a terminal end of the second guide part 35c and inclined toward the pivot pin 19.

Slidably engaged with the C-shaped guide slot 35 is a guide pin 39 which is equipped with a bush 37. The guide pin 39 has a flanged head portion 39a.

An upper portion of the guide pin 39 is slidably engaged with an elongate slot 45 formed in a first slide member 43 of plastic which is slidably put on the base portion 17 of the handle lever 15. The head portion 39a of the guide pin 39 is projected upward from the slot 45. A lower portion of the guide pin 39 is slidably engaged with an elongate slot 41 which is formed in the base plate 13 in a manner to extend along the straight line "L". The lower end portion of the guide pin 39 from the slot 41 is slidably engaged with an elongate slot 61 formed in a second slide member 47 which is positioned beneath the base plate 13. The lower terminal end of the guide pin 39 is secured to a slidable member 49 by means of caulking. The slidable member 49 is positioned beneath the second slide member 47.

The first slide member 43 extends along the straight line "L" and has at one end portion thereof the elongate slot 45. The first slide member 43 is formed around the periphery thereof with a wall 51. The wall 51 has a higher part 53 which surrounds the slot 45.

As is seen from FIG. 1, upon assembly of the lock device 3, the higher part 53 of the wall 51 is arranged to conceal the head portion 39a of the guide pin 39 from the slit 23 of the housing 7. The higher part 53 thus serves as a protector wall as will become much apparent as the description proceeds.

The first slide member 43 has at the other end portion a connecting opening 55 into which a stud member 57 raised from the second slide member 47 is inserted for achieving a united connection therebetween. For achieving this united connection, the opening 55 is formed with an engaging surface 55a and the stud member 57 is formed at its circular root portion 59 with a stepped engaging portion 59a, the engaging surface 55a and the stepped engaging portion 59a being latchingly engaged with each other as will be seen from FIG. 1.

As will be understood from FIG. 4, for coupling the first and second slide members 43 and 47 with an interposal of both the base portion 17 of the handle lever 15 and the base plate 13 therebetween, the first slide member 43 (see the slide member 43 illustrated by a phantom line) is at first oriented perpendicular to the second slide member 47 having the stud member 57 of the second slide member 47 put into the opening 55, and then, the first slide member 43 is turned 90 degrees about the axis of the stud member 57 to be parallelly mounted on the second slide member 47. With this, the engaging surface 55a of the opening 55 and the stepped engaging portion 59a of the stud member 57 become latched to each other.

The second slide member 47 has a front portion (no numeral) which is projected forwardly through a slot 13b formed in a front portion of the base plate 13. The slot 13b is merged with a rectangular aperture 13c which extends toward the elongate slot 41. The united first and second slide members 43 and 47 are thus slidable along the straight line "L" relative to the base plate 13.

In order to restrict the forward movement (viz., the movement in the direction denoted by the arrow "F") of the united slide members 43 and 47, the second slide member 47 is formed with two stoppers 47a and 47a. That is, the forward movement of the united slide members stops when the two stoppers 47a and 47a are brought into abutment with front walls 13a of the base plate 13 beside the aperture 13b.

As is seen from FIG. 1, the stud member 57 of the second slide member 47, which projects upward through the rectangular aperture 13c of the base plate 13 and the connecting opening 55 of the first slide member 43, is exposed to a slot 7c formed in a bottom wall of a recess 7d which is formed on the major wall of the housing 7. Secured to the stud member 57 is a knob 63 which is placed in the recess 7d.

As is seen from FIGS. 1 and 4, the second slide member 47 has at its lower side a spring holder 47c from which a rod 73 extends rearwardly.

Referring back to FIG. 4, for the purpose which will be described hereinafter, the second slide member 47 has a sloped rear end 47b.

The slidable member 49 is of an elongate member. The slidable member 49 has a front end to which the lower end of the afore-mentioned guide pin 39 is secured and has a longitudinally extending slot 67. Upon assembly, the slot 67 extends along the straight line "L". Slidably engaged with the slot 67 of the slidable member 49 is a vertical part 65c of a spring holder 65 which is secured to the rear surface of the base plate 13 through the afore-mentioned pivot pin 19. The pivot pin 19 has an enlarged head portion 19a. It is thus to be noted that the slidable member 49 is movable relative to the base plate 13 having the slot 67 slidably engaged with the vertical part 65c of the fixed spring holder 65. The spring holder 65 has a sloped front surface 65a which is contactable with the afore-mentioned sloped rear end 47b of the second slide member 47. The spring holder 65 has a rearwardly extending rod 71.

Front and rear ends 69 and 70 of the slidable member 49 are bent downwardly. The rear bent end 70 has an opening 70a through which the rod 71 of the spring holder 65 passes slidably. A coil spring 75 is disposed about the rod 71 and compressed between the spring holder 65 and the rear bent end 70 of the slidable member 49. The front bent end 69 has an opening 69a through which the afore-mentioned rod 73 of the second slide member 47 passes slidably. A coil spring 77 is disposed about the rod 73 and compressed between the spring holder 47c of the second slide member 47 and the front bent end 69 of the slidable member 49.

Accordingly, as is seen from FIG. 1, due to the biasing force of the coil spring 75, the slidable member 49 is biased rightwardly, that is, in a direction to achieve abutment of the front (or left) end of the slot 67 with the pivot pin 19. Thus, when the handle lever 21 assumes the lock position as shown in FIG. 1, the biasing force of the coil spring 75 causes the guide pin 39 to abut against rear ends of the elongate slots 61 and 41 and against a rear end of the shorter engaging part 35a of the C-shaped guide slot 35. Furthermore, under such condition, the sloped rear end 47b of the second slide member 47 and the sloped front end 65a of the spring holder 65 are kept in abutment with each other.

Accordingly, when, under this condition, the knob 63 is moved forward, that is, in the direction of the arrow "F" against the force of the coil spring 75, the guide pin 39 is moved forward in the C-shaped guide slot 35 to a position away from the shorter engaging part 35a. It is to be noted that such forward movement of the knob 63 has no effect on the other spring 77 because, during the movement, the distance between the spring holder 47c of the second slide member 47 and the front bent end 69 of the slidable member 49 remains unchanged.

As is seen from FIG. 4, a key cylinder 79 is arranged in front of the second slide member 47. The key cylinder 79 is equipped with a stopper plate 81. As is understood from FIG. 5, by turning the key cylinder 79 with a key (not shown), the stopper plate 81 is pivoted between a lock position as shown by a solid line and an unlock position as shown by a phantom line. In the lock position, the stopper plate 81 is placed on the way on which the second slide member 47 moves, and in the unlock position, the stopper plate 81 is placed away from the way.

In the following, operation of the lock device of the present invention will be described.

For ease of understanding, the description will be commenced with respect to a condition wherein the detachable roof 5 is set on the car body 1 keeping a locked connection therebetween.

Under this condition, the handle lever 15 assumes the position "I" wherein due to the force of the coil spring 75, the guide pin 39 abuts against the rear ends of the elongate slots 41 and 61 and the shorter engaging part 35a of the C-shaped guide slot 35. Furthermore, under such condition, the key cylinder 79 assumes its lock position (see FIGS. 1 and 5) placing the stopper plate 81 on the way of the second slide member 47. Thus, the second slide member 47, more specifically, the knob 63 secured thereto is prevented from moving leftward in FIGS. 1 and 5, that is, in a direction to disengage the guide pin 39 from the shorter engaging part 35a of the C-shaped guide slot 35. In other words, the second slide member 47 is kept locked. Thus, the handle lever 15 can not be pivoted from the lock position "I" to the unlock position "II".

When removal of the detachable roof 5 from the car body 1 is needed, the following steps are carried out.

Figure 6:
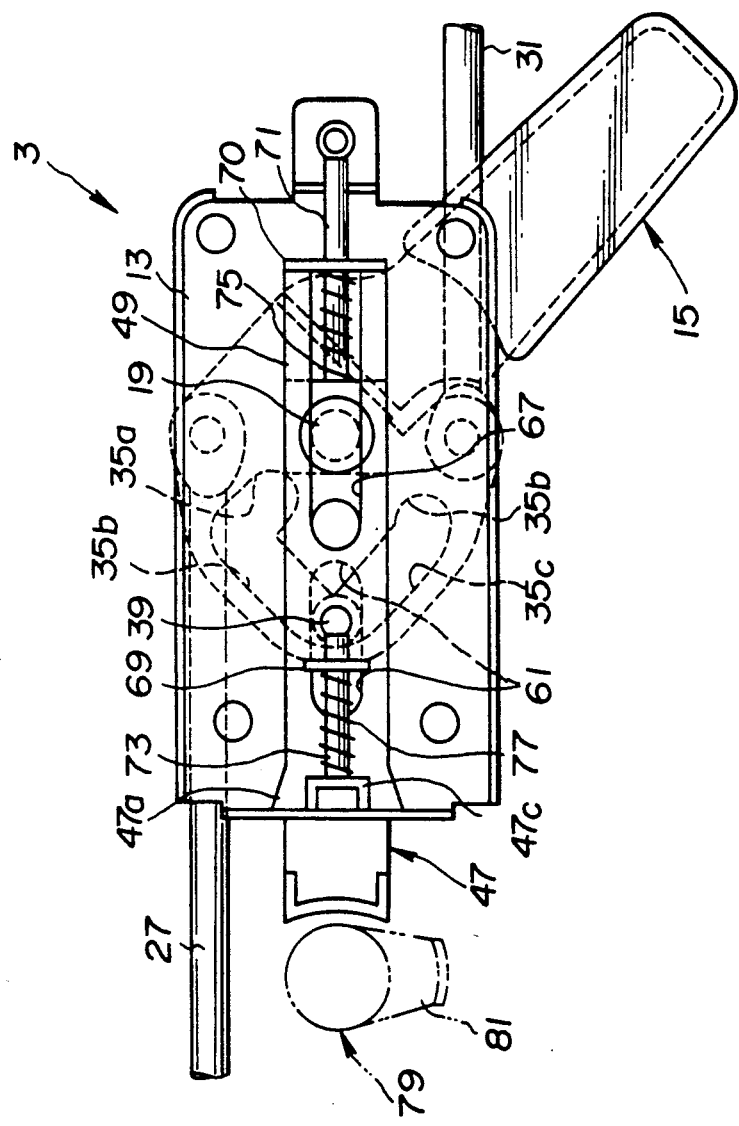
Figure 9:
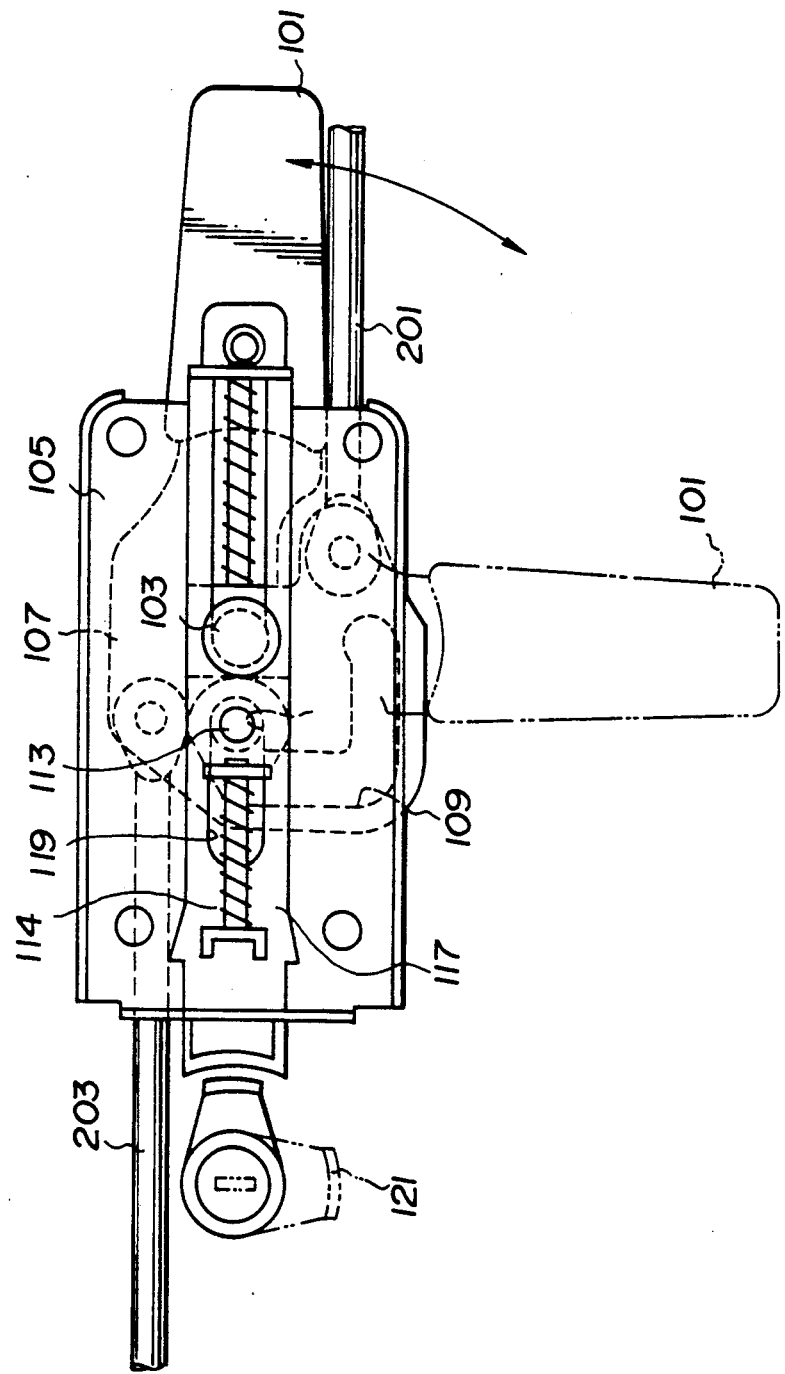
FIGS. 9 and 10 are bottom views of a conventional lock device, showing different conditions of the same.
Figure 10:
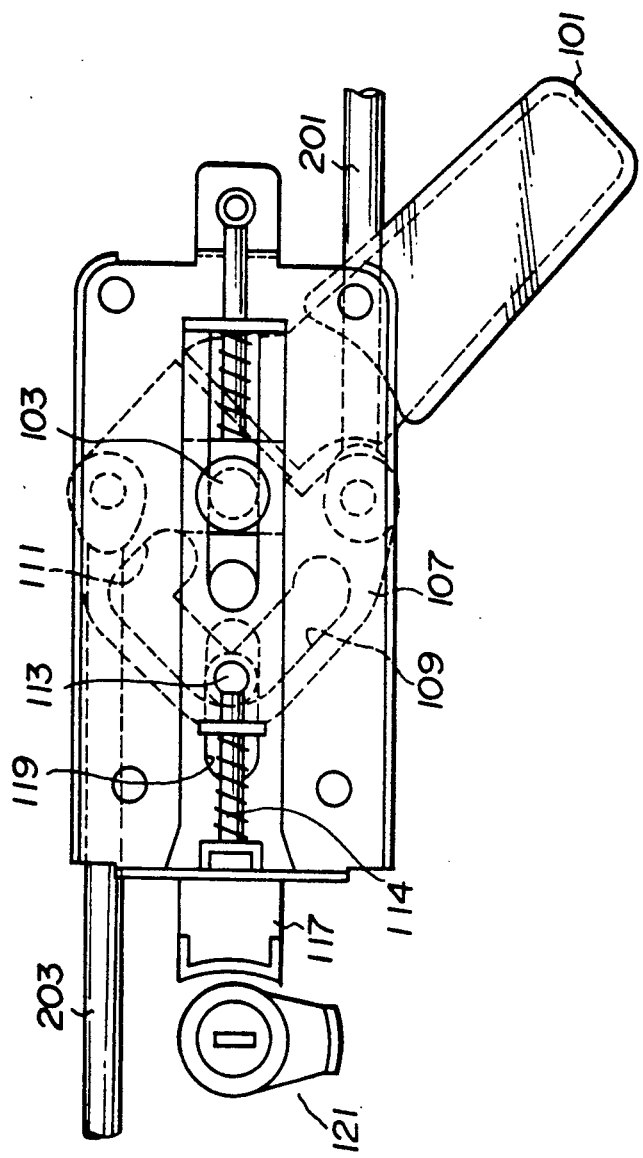
Figure 11:
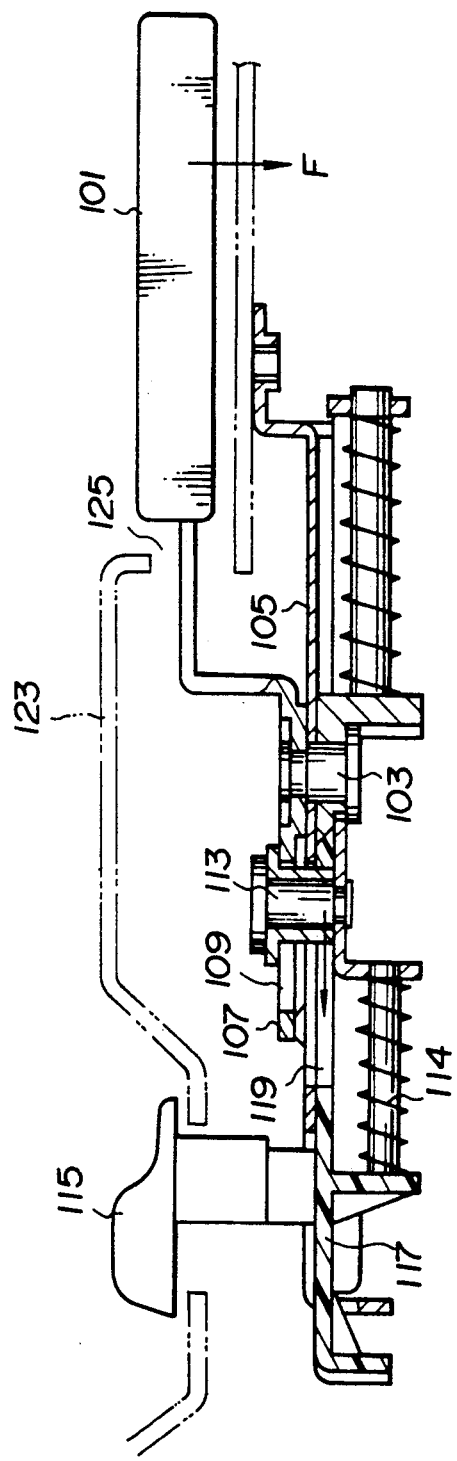
FIG. 11 is a sectional view of the conventional lock device.

First, the key cylinder 79 is turned to the unlock position pivoting the stopper plate 81 away from the way of the second slide member 47. With this, the locked condition of the second slide member 47 is cancelled. Then, the knob 63 is moved leftward in FIGS. 1 and 5 against the force of the spring 75 moving and disengaging the guide pin 39 from the shorter engaging part 35a of the C-shaped guide slot 35. During this, the slidable member 49 is also moved forward compressing the spring 75. Then, with the knob 63 biased to keep the left position, the handle lever 15 is pivoted clockwise in FIG. 5 to the unlock position "II" as shown in FIG. 7 through an intermediate position as shown in FIG. 6. As is understood from FIG. 6, during the movement of the handle lever 15, the guide pin 39 is compelled to pass a dead point which is defined between the first and second guide parts 35b and 35c of the guide slot 35. As is described hereinabove, when the handle lever 15 assumes the unlock position "II", the locked engagement of the roof 5 with the car body 1 is cancelled. Thus, the roof 5 can be removed from the car body 1.

When fixing the detachable roof 5 to the car body 1 is needed, the following steps are taken.

First, the roof 5 is properly put on the car body 1. Then, the handle lever 15 is pivoted from the unlock position "II" to the lock position "I" and thereafter the key cylinder 79 is turned to the lock position with the key.

In the following, advantages of the present invention will be described.

First, the theft protection is assured. That is, when the detachable roof 5 is set on the car body 1 keeping the locked engagement therebetween, the guide pin 39 at the shorter engaging part 35a of the guide slot 35 is concealed by the higher wall part 53 of the first slide member 43. In fact, due to provision of the higher wall part 53, unjust manipulation of the guide pin 39 by a pick or the like which may be inserted through the clearance 23 (see FIG. 1) is assuredly prevented.

Second, since the base portion 17 of the handle lever 15 is intimately sandwiched between the base plate 13 and the first slide member 43, the pivotal movement of the handle lever 15 is smoothly carried out without play. The guide pin 39 and the pivot shaft 19 are free of large stress.

What is claimed is:

1. A lock device for locking a detachable roof to a car body, comprising:
    a housing mounted to said detachable roof, said housing defining a certain clearance through which the interior of said housing is exposed to the outside of the housing;
    a handle lever including a base portion pivotally arranged in said housing and a grip portion projected into the outside of said housing, said base portion being formed with a curved guide slot which has at least a locking part;
    a lock member linked to said handle lever in such a manner that, when said handle lever is pivoted to a lock position, said lock member becomes operative and, when said handle lever is pivoted to an unlock position, said lock member becomes inoperative;
    a guide pin movably received in said housing and slidably engaged with said curved guide slot of said handle lever, said guide pin suppressing said handle lever from pivoting from said lock position toward said unlock position when received in said locking part of said guide slot;
    a slide member incorporated with said guide pin, said slide member being movable in a given direction to disengage said guide pin from said locking part;
    a lockable stopper which can assume a locking position to suppress the movement of said slide member in said given direction; and
    a wall member raised from said slide member in a manner to conceal said guide pin from said certain clearance.

2. A lock device as claimed in claim 1, further comprising biasing means by which said guide pin is biased to keep the engagement of said guide pin with said locking part of said guide slot.

3. A lock device as claimed in claim 2, further comprising a base plate which is fixedly installed in said housing and has said base portion of said handle lever pivotally connected thereto.

4. A lock device as claimed in claim 3, in which said slide member includes first and second slide portions which are detachably connected to move together, said base portion of said handle lever being intimately and slidably sandwiched between said first slide portion of said slide member and said base plate to achieve a smooth pivoting movement of the handle lever about the pivoted portion.

5. A lock device as claimed in claim 4, in which said first slide portion is slidably put on said base portion of said handle lever and said second slide portion is slidably received beneath said base portion.

6. A lock device as claimed in claim 5, in which said first and second slide portions of said slide member are formed with respective elongate slots which are exposed to an elongate slot formed in said base plate, the elongate slots of said first and second slide portions coinciding with each other.

7. A lock device as claimed in claim 6, in which said guide pin passes through the elongate slot of said first slide portion, the guide slot of said handle lever, the elongate slot of said base plate, and the elongate slot of said second slide portion and is held by said biasing means.

8. A lock device as claimed in claim 7, in which said biasing means comprises:
    a coil spring having one end connected to said base plate;
    a slidable member having one end secured to said guide pin and the other end on which the other end of said coil spring is seated.

9. A lock device as claimed in claim 8, in which said biasing means further comprises:
    a spring holder secured to a rear surface of said base plate;
    a rod extending from said spring holder and having said coil spring disposed thereabout; and
    means defining in said the other end of said slidable member an opening through which said rod passes.

10. A lock device as claimed in claim 9, in which said biasing means further comprises:
    another spring holder secured to a lower surface of said second slide portion;
    another rod extending from said another spring holder;
    another coil spring disposed about said another rod having one end seated on said another spring holder and the other end seated on said one end of said movable member; and
    means defining in said one end of said movable member an opening through which said another rod passes.

11. A lock device as claimed in claim 10, in which said spring holder of said base plate has a first sloped engaging edge and said another spring holder of said second slide portion has a second sloped engaging edge, these sloped engaging edges being matable.

12. A lock device as claimed in claim 11, in which said second slide portion of said slide member is formed with a stud member to which a knob is secured, said knob being exposed to the outside of said housing.

13. A lock device as claimed in claim 12, in which said second slide portion of said slide member is formed with stopper projections which are brought into abutment with a part of said base plate to restrict the movement of said slide member in said given direction.

14. A lock device for locking a detachable roof to a car body, comprising:
    a housing secured to said roof;
    a base plate secured to said roof and installed in said housing;
    means defining a certain clearance through which the interior of said housing is exposed to the outside of the housing;

a handle lever slidably put on and pivotally connected at its base portion to said base plate, said base portion being formed with a curved guide slot which includes first and second parts;

a lock pin linked to said handle lever in such a manner that the lock pin becomes operative when said handle lever is pivoted to a lock position and becomes inoperative when said handle lever is pivoted to an unlock position;

a guide pin movably carried by said base plate and slidably engaged with said curved guide slot of said handle lever;

a slide member slidably put on said base portion of said handle lever and incorporated with said guide pin, said slide member being axially movable between a first position wherein said guide pin is received in said first part of said guide slot thereby to prevent the handle lever from pivoting from said lock position toward said unlock position and a second position wherein said guide pin is disengaged from said first part thereby to permit the pivoting of said handle lever from said lock position toward said unlock position;

a stopper movable between a locking position to suppress the movement of said slide member toward said second position and an unlocking position to permit the movement of said slide member toward said second position; and a wall member raised from said slide member, said wall member being positioned between said guide pin and said certain clearance.

* * * * *